June 9, 1925.  
F. HARNESS  
MILK COOLER  
Filed March 8, 1924  
1,541,708
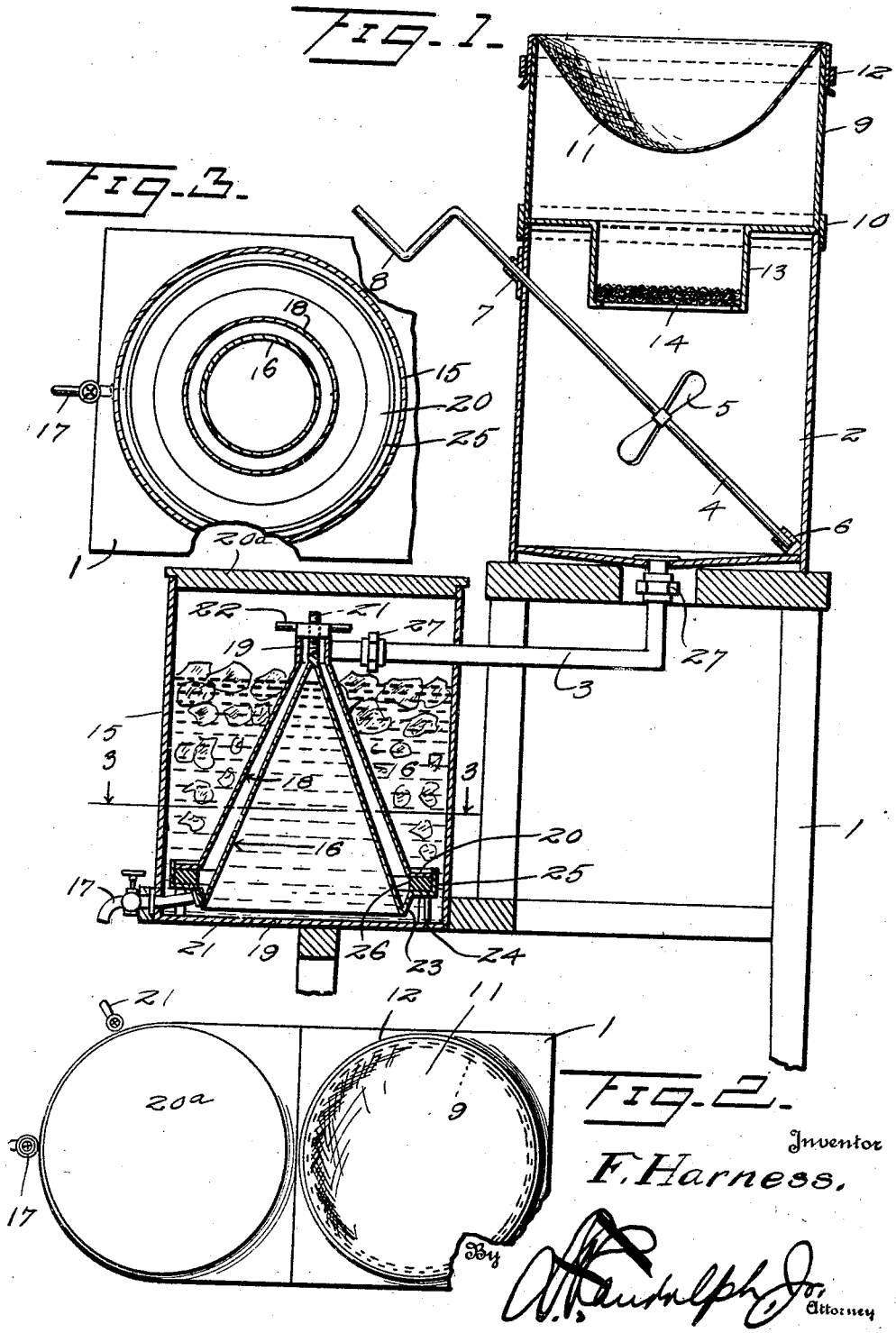

Patented June 9, 1925.

1,541,708

UNITED STATES PATENT OFFICE.

FOSTER HARNESS, OF OILTON, OKLAHOMA.

MILK COOLER.

Application filed March 8, 1924. Serial No. 697,822.

*To all whom it may concern:*

Be it known that I, FOSTER HARNESS, a citizen of the United States, residing at Oilton, in the county of Creek and State of Oklahoma, have invented certain new and useful Improvements in Milk Coolers; and I do hereby declare the following to be a full, clear, and exact description of the invention, such as will enable others skilled in the art to which it appertains to make and use the same.

The invention has relation to an appliance for eliminating the animal heat of milk preliminary to bottling the same for market and has for its object to provide a contrivance which is simple, effective and rapid in operation and which is sanitary and capable of being easily and quickly cleaned.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a sectional view of an appliance embodying the invention,

Figure 2 is a top plan view thereof, and

Figure 3 is a detail sectional view on the line 3—3 of Figure 1.

Corresponding and like parts are referred to in the following description and designated in the several views of the drawings by like reference characters.

The numeral 1 designates a suitable framework for supporting the operating parts. A vessel 2 is mounted upon the framework and is adapted to receive the milk from which the animal heat is to be extracted. A pipe 3 connects with the bottom of the vessel 2 and said bottom slopes to a central point to insure a thorough draining of the milk. An agitator is disposed within the vessel 2 for stirring the milk to prevent separation of the cream. The agitator comprises a shaft 4 which is disposed diagonally within the vessel and a fan 5 fast to the shaft so as to rotate therewith. The lower end of the shaft 4 is mounted in a bearing 6 disposed in the angle formed between the bottom and side walls of the vessel and the upper portion of the shaft extends through the side of the vessel near the top thereof and is mounted in a bearing 7, the projecting end terminating in an operating shank or handle 8 whereby the agitator may be operated.

A receptacle 9 is mounted upon the vessel 2 and is prevented from lateral displacement by means of a band 10 which is attached to the receptacle 9 and encircles the upper portion of the vessel 2. A strainer cloth 11 is applied to the upper portion of the receptacle 9 and is held in place by means of a hoop 12. A collar 13, forming a part of the receptacle 9, extends into the upper portion of the vessel 2 and is provided with a filtering bed 14 through which the milk passes to remove foreign particles therefrom, such as hair, sand and the like. The filtering bed 14 comprises upper and lower screens and an interposed layer of cotton or analogous filtering material.

A cooler is mounted upon the framework 1 wholly below the vessel 2 and comprises a tank 15 and a refrigerator, the latter being coupled at its upper end to the pipe 3 and its lower end provided with a faucet 17 whereby to control the discharge of the milk. The tank 15 is adapted to contain a cooling medium such as water and ice and is closed by a cover 20$^a$.

The refrigerator is of conical form and comprises spaced concentric shells 16 and 18. The outer shell 18 has a neck 19 at its upper end and an outer flange 20 at its lower end. The inner shell 16 has a threaded stem 21 at its upper end which passes through the neck 19 and receives a hand nut 22 and an upwardly flared flange 23 at its lower end. The flange 23 has an outer flange 24 from which an upstanding flange 25 projects. A packing 26 is placed between the flanges 20 and 24 and is clamped therebetween by screwing the nut 22 on the stem 21 and against the neck 19. Unions 27 detachably connect the pipe 3 to the vessel 2 and the refrigerator. The construction is such as to admit of the parts being readily taken apart for cleaning and easily reassembled after being cleaned.

The milk to be cooled is poured into the receptacle 9 and passes through the strainer 11 and filter 14 and is agitated by rotating the shaft 4 and the milk with the foreign particles removed passes from the vessel 2 through the pipe 3, thence through the refrigerator which eliminates the animal heat, the cool milk being drawn off through the faucet 17 and bottled for market or otherwise used as required.

What is claimed is:

1. A cooler of the class described having inner and outer shells providing a space between them through which the material to be cooled is adapted to pass, the inner shell being substantially conical and at its base extending outwardly and upwardly to provide first and second flanges, a gasket seated on the first flange, the second flange extending above said gasket, the outer shell resting on said gasket and being surrounded by the second flange, a screw-threaded stem at the apex of the inner shell, a nut threaded on said stem and engaging the adjacent end of the outer shell, and means to bring a refrigerant into contact with the outer shell.

2. A cooler of the class described having inner and outer shells providing a space between them through which the material to be cooled is adapted to pass, the inner shell being substantially conical and at its base extending outwardly and upwardly to provide first and second flanges, a gasket seated on the first flange, the second flange extending above said gasket, the outer shell resting on said gasket and being surrounded by the second flange, a screw-threaded stem at the apex of the inner shell, a nut threaded on said stem and engaging the adjacent end of the outer shell, a vessel containing said shells and adapted to contain a refrigerant about the outer shell, an outlet from the said space passing through the vessel, and an inlet to the said space passing through the vessel.

In testimony whereof I affix my signature in presence of two witnesses.

FOSTER HARNESS.

Witnesses:
W. K. GAYMAN,
A. J. YOUNG.